United States Patent
Peng et al.

(10) Patent No.: US 8,391,108 B2
(45) Date of Patent: Mar. 5, 2013

(54) HYBRID NEAR-FIELD TRANSDUCER FOR HEAT ASSISTED MAGNETIC RECORDING

(75) Inventors: Chubing Peng, Bloomington, MN (US); Michael Allen Seigler, Eden Prairie, MN (US); Jie Zou, Eden Prairie, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 264 days.

(21) Appl. No.: 12/854,965

(22) Filed: Aug. 12, 2010

(65) Prior Publication Data

US 2012/0039155 A1    Feb. 16, 2012

(51) Int. Cl.
*G11B 11/00* (2006.01)
(52) U.S. Cl. .................. 369/13.33; 369/112.27
(58) Field of Classification Search ............ 369/13.33, 369/13.32, 13.24, 13.14, 13.03, 13.02, 13.12, 369/13.01, 13.17, 13.35, 112.27, 112.01, 369/112.09; 360/59, 125.31, 125.74
See application file for complete search history.

(56) References Cited

U.S. PATENT DOCUMENTS

| | | | |
|---|---|---|---|
| 6,795,630 B2 * | 9/2004 | Challener et al. ............. 385/129 |
| 7,266,268 B2 * | 9/2007 | Challener et al. .............. 385/37 |
| 7,272,079 B2 | 9/2007 | Challener |
| 7,330,404 B2 | 2/2008 | Peng et al. |
| 7,440,660 B1 | 10/2008 | Jin et al. |
| 7,864,434 B2 * | 1/2011 | Peng ............................. 359/642 |
| 7,965,464 B2 * | 6/2011 | Batra et al. ...................... 360/59 |
| 8,248,891 B2 * | 8/2012 | Lee et al. ................... 369/13.17 |
| 2003/0184903 A1 | 10/2003 | Challener |
| 2004/0001394 A1 | 1/2004 | Challener et al. |
| 2004/0001420 A1 | 1/2004 | Challener |
| 2004/0008591 A1 | 1/2004 | Johns et al. |
| 2005/0078565 A1 | 4/2005 | Peng et al. |
| 2005/0289577 A1 | 12/2005 | Seigler et al. |
| 2007/0036040 A1 | 2/2007 | Mihalcea et al. |
| 2008/0170319 A1 | 7/2008 | Seigler et al. |

OTHER PUBLICATIONS

U.S. Appl. No. 12/272,984, filed Nov. 18, 2008, Lee et al.
U.S. Appl. No. 12/391,326, filed Feb. 24, 2009, Seigler et al.

\* cited by examiner

*Primary Examiner* — Ali Neyzari
(74) *Attorney, Agent, or Firm* — Hollingsworth Davis, LLC (57) ABSTRACT

An apparatus includes a planar waveguide having a core layer and a cladding layer adjacent to the core layer, the waveguide being shaped to direct light to a focal point; a magnetic pole adjacent to the cladding layer; and a near-field transducer positioned adjacent to the focal point, wherein the near-field transducer includes an enlarged portion and a peg having a first end positioned adjacent to an end of the waveguide and a second end positioned adjacent to a side of the enlarged portion. A data storage device that includes the apparatus is also provided.

9 Claims, 6 Drawing Sheets

HYBRID NEAR-FIELD TRANSDUCER FOR HEAT ASSISTED MAGNETIC RECORDING

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

There is a need to deliver highly concentrated optical radiation from the HAMR head to heat a magnetic media, while controlling the location of the heated area relative to the magnetic pole and the shape of the heated area for sharp magnetic transitions.

SUMMARY

In one aspect, the invention provides an apparatus including a planar waveguide having a core layer and a cladding layer adjacent to the core layer, the waveguide being shaped to direct light to a focal point; a magnetic pole adjacent to the cladding layer; and a near-field transducer positioned adjacent to the focal point, wherein the near-field transducer includes an enlarged portion and a peg having a first end positioned adjacent to an end of the waveguide and a second end positioned adjacent to a side of the enlarged portion.

DETAILED DESCRIPTION OF THE INVENTION

Figure 1:
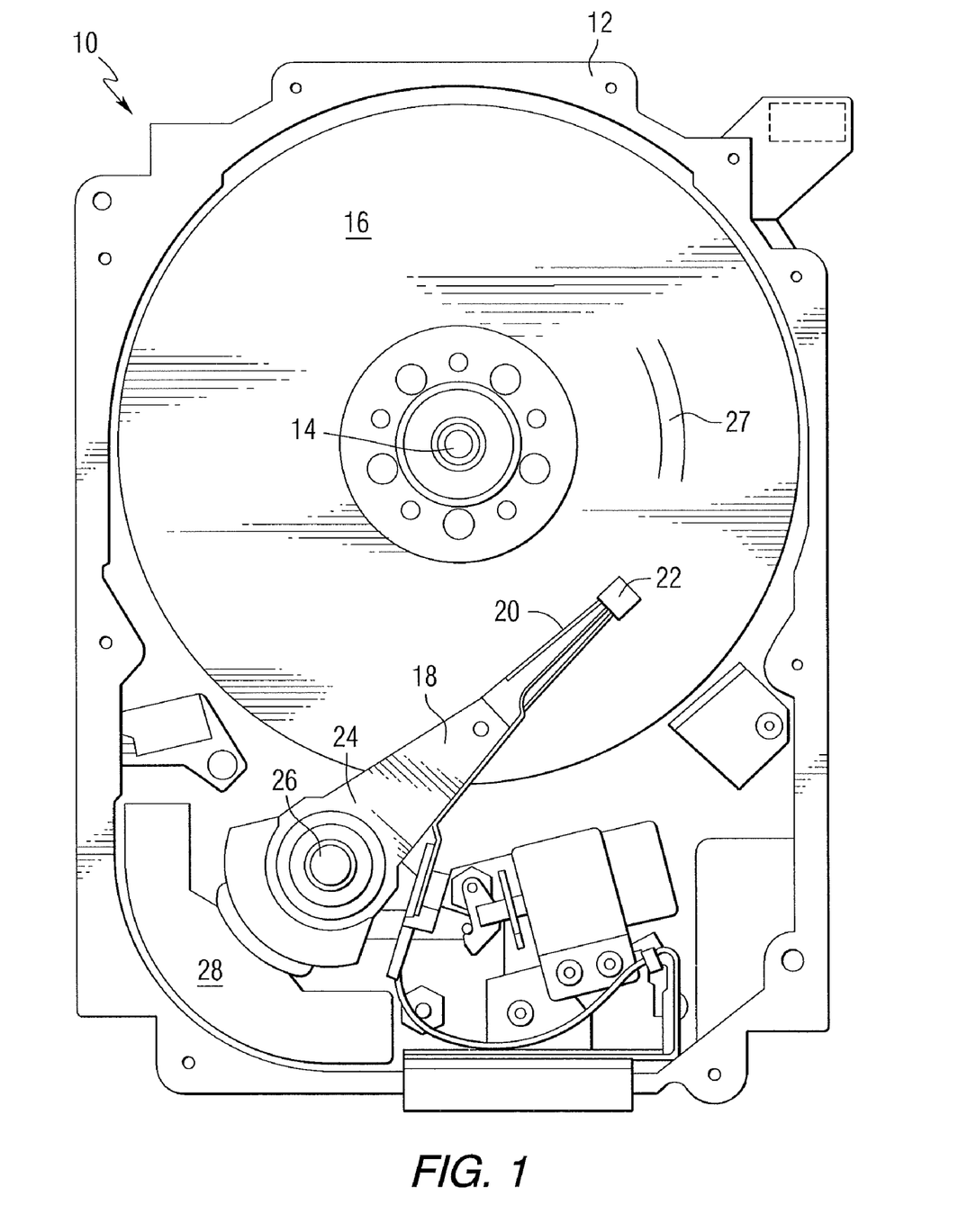
FIG. 1 is a pictorial representation of a data storage device in the form of a disc drive that can include a transducer in accordance with an aspect of this invention.

FIG. 1 is a pictorial representation of a data storage device in the form of a disc drive 10 that can utilize a transducer assembly constructed in accordance with an aspect of the invention. The disc drive 10 includes a housing 12 (with the upper portion removed and the lower portion visible in this view) sized and configured to contain the various components of the disc drive. The disc drive 10 in this example includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art. While FIG. 1 shows a particular disc drive, the invention is not limited to use in any particular type of data storage device.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
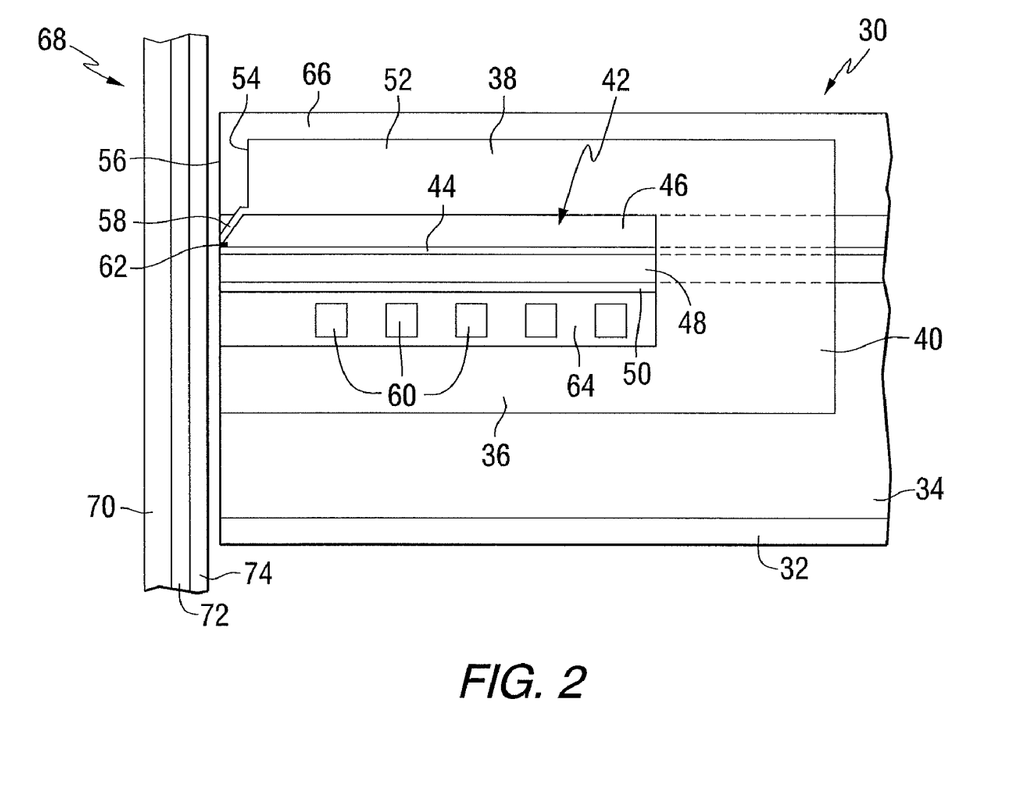
FIG. 2 is a cross-sectional view of a recording head.

FIG. 2 is a cross-sectional view of an example of a recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 may be positioned adjacent to one of the cladding layers. However, it should be understood that various was to couple light into a waveguide are known and the particular structure used to couple light into the waveguide is irrelevant to the present invention.

The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

A recording medium 68 is positioned adjacent to or under the recording head 30. The recording medium 68 includes a substrate 70, which may be made of any suitable material such as ceramic glass or amorphous glass. A soft magnetic underlayer 72 is deposited on the substrate 70. The soft magnetic underlayer 72 may be made of any suitable material such as, for example, alloys or multilayers of Co, Fe, Ni, Pd, Pt or Ru. A hard magnetic recording layer 74 is deposited on the soft underlayer 72, with the perpendicular oriented magnetic domains contained in the hard recording layer 74. Suitable hard magnetic materials for the hard magnetic recording layer 74 may include at least one material selected from, for example, FePt or CoCrPt alloys having a relatively high anisotropy at ambient temperature.

The optical waveguide 42 acts in association with a light source which transmits light to the waveguide, for example via an optical path. The light is coupled to the optical waveguide by a coupling means such as a grating. The light source may be, for example, a laser diode, or other suitable source of electromagnetic (EM) radiation. The light propagates through the optical waveguide toward the recording medium. EM radiation is transmitted from the waveguide for heating the recording medium, and particularly for heating a localized area of the recording layer. Although the recording head may be a perpendicular magnetic recording head and the storage medium may be a perpendicular magnetic recording medium, it will be appreciated that the invention may also be used in conjunction with other types of recording heads and/or recording mediums where it may be desirable to employ heat assisted recording.

Figure 3:
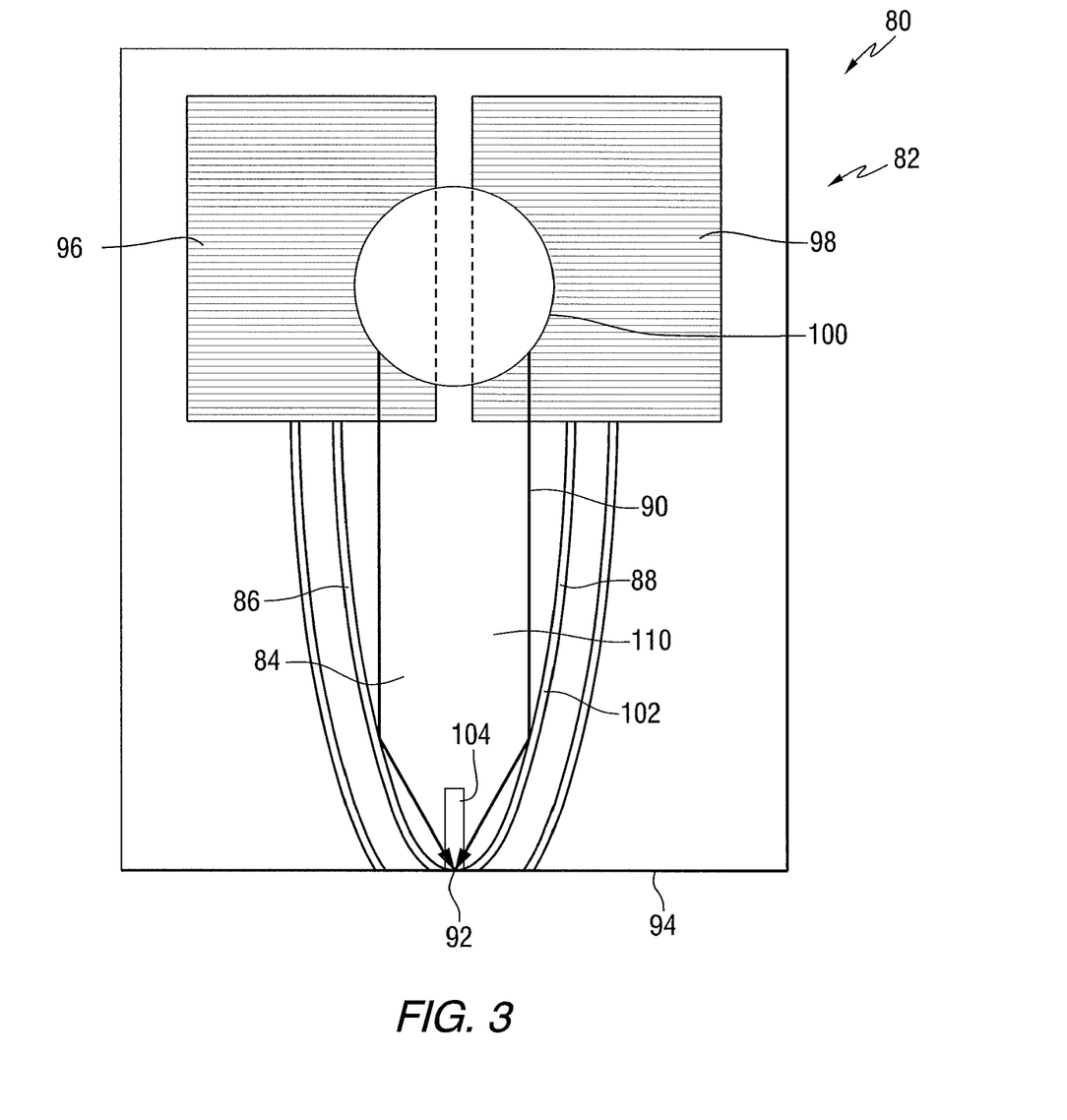
FIG. 3 is an elevation view of a waveguide in a recording head.

FIG. 3 is an elevation view of a waveguide 80 in a recording head 82. The waveguide includes a planar core layer 84 having generally parabolic edges 86 and 88, shaped to reflect light 90 to a focal point 92 at or near the air bearing surface 94. Gratings 96 and 98 are positioned on the core layer and used to couple light into the core layer. The gratings can be offset with respect to each other so that the electric component of the light in the two sides of the waveguide adds at the focal point. The light that impinges the gratings is shown as a spot 100. A reflective coating 102, which can be Au, is provided along the edges of the core layer. This arrangement forms a solid immersion mirror. A return pole 104 is positioned adjacent to the air bearing surface. While FIG. 3 shows a grating coupler, it will be understood that there are other ways to couple light into a waveguide to produce the desired wavefront. It is preferred that the wavefront has π phase difference between left and right side of the beam.

Figure 4:
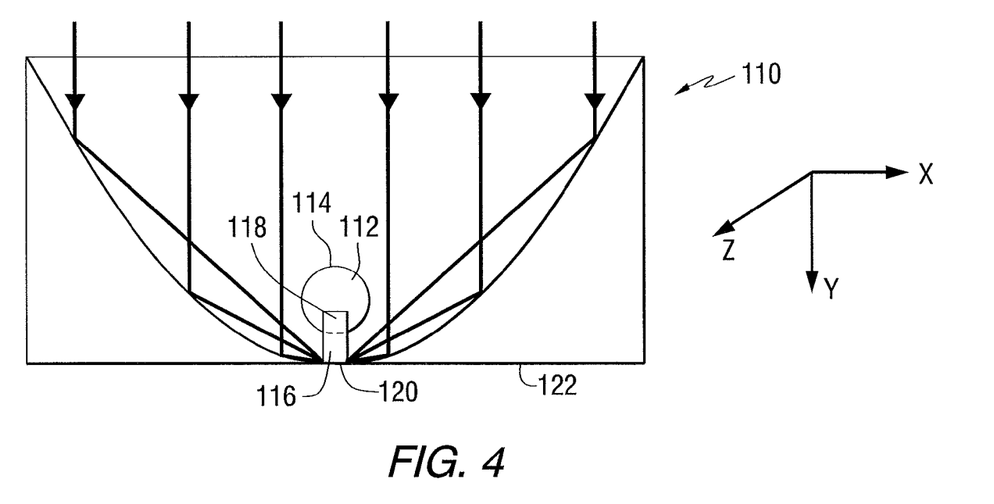
FIG. 4 is a cross-sectional view of a portion of a waveguide and a near-field transducer.

FIG. 4 is a cross-sectional view of a portion of a waveguide 110 and a near-field transducer 112. The near-field transducer includes an enlarged portion, in the from of a disk shaped portion 114, and a peg 116 that is offset with respect to the plane of the disk shaped portion and includes a portion 118 that is positioned adjacent to a side of the disk shaped portion. An end 120 of the peg is located adjacent to the air bearing surface 122. The enlarged portion can have, for example, a circular, cylindrical, or rectangular cross-sectional shape.

Figure 5:
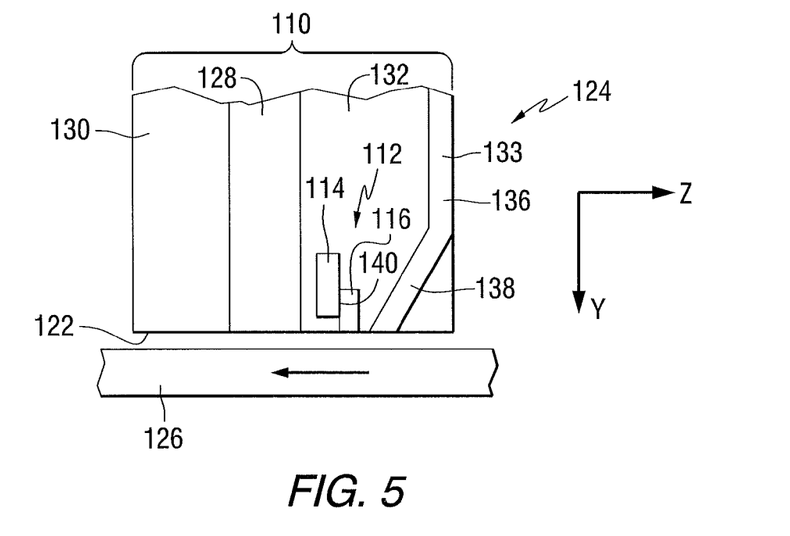
FIG. 5 is a side elevation view of a portion of the recording head of FIG. 4, with a storage media.

FIG. 5 is a side view of a portion of a recording head 124 that includes the structure of FIG. 4, and a storage media 126. FIG. 5 shows a planar waveguide 110 including a core layer 128 and cladding layers 130 and 132 positioned adjacent to and on opposite sides of the core layer. The near-field transducer 112 is positioned in the cladding layer 132. A magnetic pole 133 is positioned adjacent to (or at least partially in) the cladding layer 132. The magnetic pole includes a first portion 136 and a second portion 138. The second portion extends from the first portion to an air bearing surface 120 and is sloped toward the near-field transducer 112. The peg 116 is shown to overlap a portion of a surface 140 of the disk shaped portion 114.

The magnetic storage media can be placed, for example 10-nm or less from the air bearing surface. The media is spinning, as indicated by an arrow. The near-field transducer is positioned in the cladding layer 132 of the planar waveguide 110 near the focusing spot formed by the solid-immersion-mirror (SIM) fabricated in the planar waveguide, as shown in FIG. 3.

FIGS. 4 and 5 show a hybrid near-field transducer. The hybrid near-field transducer in FIGS. 4 and 5 includes a metallic peg, or nanorod, 116 at least a portion of which lies adjacent to a surface of a metallic disk shaped portion 114. That is, the hybrid near-field transducer includes two metallic structures with one on the top of the other. During fabrication of the recording head, the peg would be formed on top of the disk shaped portion. Thus the peg can be referred to as the top structure. The peg, or top structure, (also referred to as a nanorod or protrusion) is positioned nearer to the magnetic pole and protrudes from the bottom of the disk shaped portion to the air-bearing surface. Optical energy is transferred from the waveguide to the protrusion by local surface-plasmon resonance. The thickness of the protrusion (i.e., the peg, nanorod, or top structure) can vary to be as thin as 10 nm or less along the z direction. Light in the waveguide impinges on the near-field transducer such that the electric field will be concentrated at the interface between the two metallic structures and near the protrusion. This arrangement allows for greater variation in the pole and NFT placement and reduces the magnetic transition curvature during magnetic recording.

Figure 6:
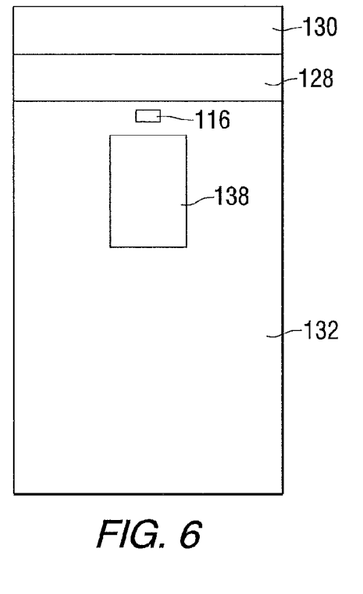
FIG. 6 is an end view of the recording head of FIG. 5.

FIG. 6 is an end view of the magnetic recording head of FIG. 5, at the air bearing surface.

Figure 7:
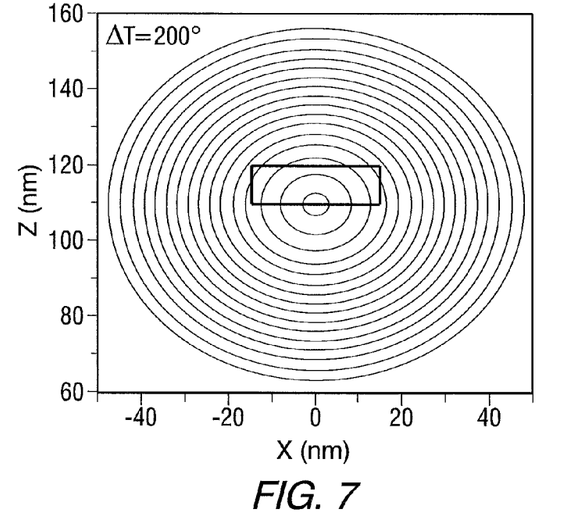
FIG. 7 is a graph of calculated thermal contours in a heated storage medium.

FIG. 7 shows the computed temperature profile in the storage medium at resonance of the near-field transducer shown in FIGS. 4 and 5. To compute the temperature profile, the nano-rod is assumed to be 10 nm thick along z direction and 30 nm wide along x direction. It protrudes 15 nm from the bottom of the disc. The disc is 200 nm in diameter and 30 nm thick. The electric field at the surface of the storage medium becomes crescent shaped with narrow profile down track (along the z direction). Thus, a high field concentration is obtained.

The thermal contour shows that a magnetic field can collocate with the hot spot in the storage medium by only 2 contours from the hottest region, which renders greater efficiency in recording. Also the thermal contours at a pole position are less curved, which will allow writing to the storage medium with sharper magnetic transitions. In this aspect, the invention provides an apparatus for efficiently coupling light from the waveguide to the storage media at a position that is subjected to a magnetic field from the write pole.

Figure 8:
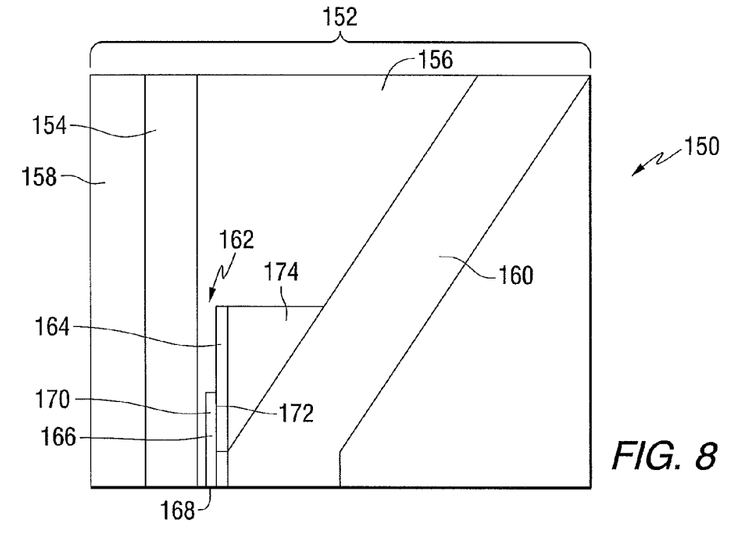
FIGS. 8-14 are side views of a magnetic pole and a near-field transducer.

FIG. 8 is a side view of a portion of a magnetic recording head 150 in accordance with another embodiment. The recording head includes a waveguide 152, which includes a core layer 154, and cladding layers 156, 158 on opposite sides of the core layer. A portion of a magnetic pole 160 is positioned in the cladding layer 156. A near-field transducer 162 is positioned in the cladding layer 156 between the magnetic pole and the core layer. The near-field transducer includes a disk shaped portion 164 and a peg 166. The peg extends to the air bearing surface 168 and includes a portion 170 that is adjacent to a side 172 of the disk shaped portion. A heat sink 174 is positioned between the near-field transducer and the pole.

Figure 9:
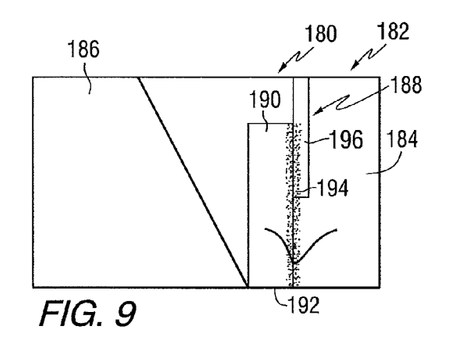

FIG. 9 is a side view of elements of a magnetic recording head 180 in accordance with another embodiment. The recording head includes a waveguide 182, which includes a core layer and cladding layers on opposite sides of the core layer. In FIG. 9, only a cladding layer 184 is shown. A portion of a magnetic pole 186 is positioned in the cladding layer 184. A near-field transducer 188 is positioned in the cladding layer 184 between the magnetic pole and the core layer. The near-field transducer includes a disc shaped portion 196 and a peg 190. The peg extends to the air bearing surface 192 and includes a portion that is adjacent to a side of the disc shaped portion, similar to the near-field transducers of FIGS. 4, 5 and 8. By using a hybrid near-field transducer, a local surface plasmon forms along a surface 194 of the peg. The magnetic pole is positioned on the opposite side of the peg from surface 194.

Figure 10:
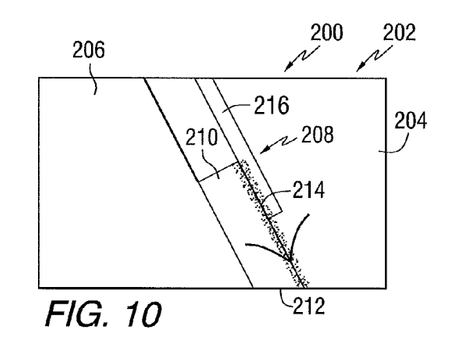

FIG. 10 is a side view of elements of a magnetic recording head 200 in accordance with another embodiment. The recording head includes a waveguide 202, which includes a core layer and cladding layers on opposite sides of the core layer. In FIG. 10, only a cladding layer 204 is shown. A portion of a magnetic pole 206 is positioned in the cladding layer 204. A near-field transducer 208 is positioned in the cladding layer 204 between the magnetic pole and the core layer. The near-field transducer includes a disc shaped portion 216 and a peg 210. The peg extends to the air bearing surface 212 and includes a portion that is adjacent to a side of the disc shaped portion, similar to the near-field transducers of FIGS. 4, 5 and 8. By using a hybrid near-field transducer, a local surface plasmon forms along a surface 214 of the peg. The magnetic pole is positioned on the opposite side of the peg from surface 214.

Figure 11:
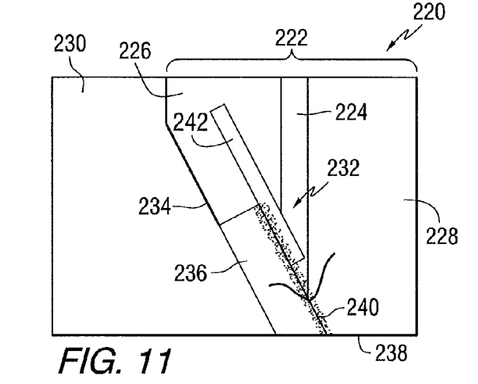

FIG. 11 is a side view of elements of a magnetic recording head 220 in accordance with another embodiment. The recording head includes a waveguide 222, which includes a core layer 224 and cladding layers 226, 228 on opposite sides of the core layer. A portion of a magnetic pole 230 is positioned in the cladding layer 226. A near-field transducer 232 is positioned adjacent to a surface 234 of the magnetic pole 230. The near-field transducer extends through the core layer 224. The near-field transducer includes a disc shaped portion 242 and a peg 236. The peg extends to the air bearing surface 238 and includes a portion that is adjacent to a side of the disc shaped portion, similar to the near-field transducers of FIGS. 4, 5 and 8. By using a hybrid near-field transducer, a local surface plasmon forms along a surface 240 of the peg. The magnetic pole is positioned on the opposite side of the peg from surface 240.

Figure 12:
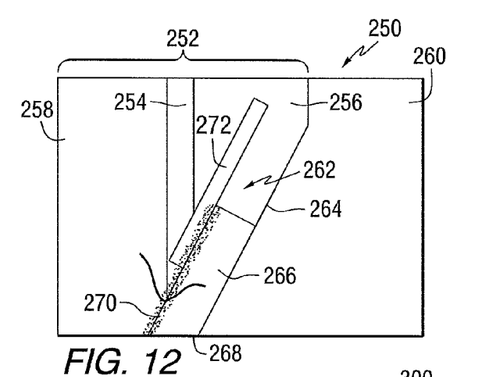

FIG. 12 is a side view of elements of a magnetic recording head 250 in accordance with another embodiment, which is a mirror image of the structure of FIG. 11. The recording head includes a waveguide 252, which includes a core layer 254 and cladding layers 256, 258 on opposite sides of the core layer. A portion of a magnetic pole 260 is positioned in the cladding layer 256. A near-field transducer 262 is positioned adjacent to a surface 264 of the magnetic pole 260. The near-field transducer extends through the core layer 254. The near-field transducer includes a disc shaped portion 272 and a peg 266. The peg extends to the air bearing surface 268 and includes a portion that is adjacent to a side of the disc shaped portion, similar to the near-field transducers of FIGS. 4, 5 and 8. By using a hybrid near-field transducer, a local surface plasmon forms along a surface 270 of the peg. The magnetic pole is positioned on the opposite side of the peg from surface 270.

Figure 13:
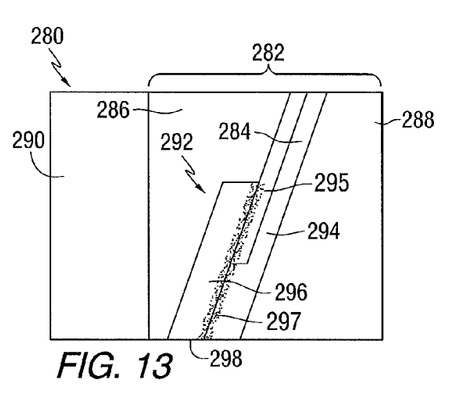

FIG. 13 is a side view of elements of a magnetic recording head 280 in accordance with another embodiment. The recording head includes a waveguide 282, which includes a core layer 284 and cladding layers 286, 288 on opposite sides of the core layer. A portion of a magnetic pole 290 is positioned in, or adjacent to, the cladding layer 286. A near-field transducer 292 is positioned adjacent to a portion 294 of the core layer 284. The near-field transducer includes a disc shaped portion 295 and a peg 296. The peg extends to the air bearing surface 298 and includes a portion that is adjacent to a side of the disc shaped portion, similar to the near-field transducers of FIGS. 4, 5 and 8. By using a hybrid near-field transducer, a local surface plasmon forms along a surface 297 of the peg. The magnetic pole is positioned on the opposite side of the peg from surface 297.

Figure 14:
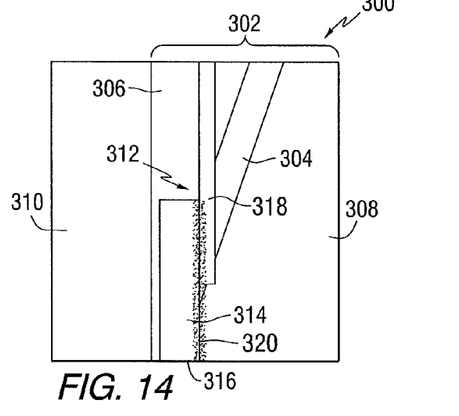

FIG. 14 is a side view of elements of a magnetic recording head 300 in accordance with another embodiment. The recording head includes a waveguide 302, which includes a core layer 304 and cladding layers 306, 308 on opposite sides of the core layer. A portion of a magnetic pole 310 is positioned in, or adjacent to, the cladding layer 306. A near-field transducer 312 extends through the core layer 304. The near-field transducer includes a disc shaped portion 318 and a peg 314. The peg extends to the air bearing surface 316 and includes a portion that is adjacent to a side of the disc shaped portion, similar to the near-field transducers of FIGS. 4, 5 and 8. By using a hybrid near-field transducer, a local surface plasmon forms along a surface 320 of the peg. The magnetic pole is positioned on the opposite side of the peg from surface 320.

FIGS. 9-14 show varieties of a hybrid near-field transducer, which eases the location requirements of the pole-NFT placement. In FIG. 9 a surface plasmon on one side of the near-field transducer would allow for closer pole-to-NFT spacing, and thus, better magnetic field to thermal spot alignment. Having the surface plasmon on only one side may also make the optical confinement and thermal spot size in the media smaller in the downtrack direction and less curved, as described above. The surface plasmon decays faster inside the metal than it does in the dielectric, so having the Au near-field transducer between the surface plasmon and pole allows for a smaller spacing between the surface plasmon and the lossy FeCo pole.

Alternatively, the near-field transducer could be right in contact with the pole, such as building the near-field transducer on the sloped wall, as shown in FIG. 10. A sloped wall may still be advantageous so that the light can be delivered to the near-field transducer with little loss.

A surface plasmon could be generated on one side by using the general Kretschmann geometry or an Otto geometry applied to this type of structure, or a similar structure as that shown in FIG. 11. The shape of the near-field transducer, dielectric material properties (n, k, thickness) and near-field transducer material properties (n, k, thickness) would need to be designed for the desired resonance wavelength.

Other methods, such as gratings/texture in the near-field transducer could be used to increase the efficiency with which light is coupled from the waveguide to the near-field transducer. If the near-field transducer can be made thin enough and the hot spot small enough such that the field from the pole reaches to the opposite side of the hot spot, the head could then be built upside down, as shown in FIG. 12. The structure of FIG. 12 could be made to be very similar to the Otto configuration by adding a dielectric between the core and the near-field transducer.

The hybrid near-field transducer design can be combined with a reverse HAMR design, as shown in FIG. 8. The near-field transducer disc that also serves as a heat sink is on top of a sloped pole. The separate peg is at top of the disc, which completes the hybrid near-field transducer. In a reverse HAMR design, the near-field transducer is at the trailing side of the pole, opposite to the normal HAMR design wherein the near-field transducer is positioned at the leading side of the pole. Reverse HAMR has the advantages of: (1) guaranteed alignment of thermal gradient and magnetic field gradient, with one enhancing the other; (2) eliminating self-erasure concern in the normal HAMR design where pole field may erase the just written bit if media temperature does not drop quickly enough after optic spot moves forward.

The hybrid NFT design optimizes at very thin peg thickness. This largely mitigates the above issue for reverse HAMR design. For media with an SUL, the write field can be increased and extended to the other side of the peg, thus will enable a higher SNR for this approach.

In another aspect of the invention, any of the recording heads described above can be included in a data storage device, such as that illustrated in FIG. 1.

The implementations described above and other implementations are within the scope of the following claims.

What is claimed is:

1. An apparatus comprising:
   a planar waveguide having a core layer and a cladding layer adjacent to the core layer, the waveguide being shaped to direct light to a focal point;
   a magnetic pole adjacent to the cladding layer; and
   a near-field transducer positioned adjacent to the focal point, wherein the near-field transducer includes an enlarged portion and a peg having a first end positioned adjacent to an end of the waveguide and a second end positioned adjacent to a side of the enlarged portion.

2. The apparatus of claim 1, wherein the enlarged portion has a circular, cylindrical or rectangular cross-sectional shape.

3. The apparatus of claim 1, wherein the magnetic pole includes a sloped surface that is closer to the peg of the near-field transducer than the enlarged portion.

4. The apparatus of claim 3, further comprising:
   a heat sink positioned between the enlarged portion and the sloped surface of the magnetic pole.

5. The apparatus of claim 3, wherein the peg is positioned adjacent to the sloped surface of the magnetic pole.

6. The apparatus of claim 5, wherein the peg extends into the core layer.

7. The apparatus of claim 1, wherein the core includes a sloped surface and the peg is positioned adjacent to the sloped surface of the core.

8. The apparatus of claim 1, wherein the core includes a sloped surface and the peg extends into the core layer.

9. The apparatus of claim 1, wherein the near-field transducer is positioned in the cladding layer or in the core layer.

* * * * *